(12) United States Patent
Lentz et al.

(10) Patent No.: US 11,157,392 B2
(45) Date of Patent: *Oct. 26, 2021

(54) DEBUGGING THROUGH CAUSALITY AND TEMPORAL PATTERING IN A EVENT PROCESSING SYSTEM

(71) Applicant: INTERNATIONAL BUSINESS MACHINES CORPORATION, Armonk, NY (US)

(72) Inventors: James Lee Lentz, Austin, TX (US); Jung Woo Van, Travis, TX (US); Yee Pin Yheng, Foster City, CA (US); David D Martin, Middlesex, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/117,101

(22) Filed: Aug. 30, 2018

(65) Prior Publication Data

US 2019/0004933 A1 Jan. 3, 2019

Related U.S. Application Data

(63) Continuation of application No. 14/817,514, filed on Aug. 4, 2015, now Pat. No. 10,083,107, which is a
(Continued)

(51) Int. Cl.
*G06F 9/44* (2018.01)
*G06F 11/36* (2006.01)
(Continued)

(52) U.S. Cl.
CPC ........ *G06F 11/3664* (2013.01); *G06F 3/0484* (2013.01); *G06F 3/04817* (2013.01);
(Continued)

(58) Field of Classification Search
CPC .... G06F 11/36; G06F 3/04817; G06F 3/0484; G06F 11/323; G06F 11/3466; G06F 11/3684; G06F 11/3688
(Continued)

(56) References Cited

U.S. PATENT DOCUMENTS 6,807,583 B2   10/2004   Hrischuk et al.
7,735,066 B1    6/2010   Myers et al.
(Continued)

OTHER PUBLICATIONS

Pramanik et al.; "Towards an Efficient Online Causality-Event-Pattern-Matching Framework", Distributed Computing Systems (ICDCS), 2013 IEEE 33rd International Conference on, Jul. 8-11, 2013, pp. 481-490.
(Continued)

*Primary Examiner* — Chuck O Kendall
(74) *Attorney, Agent, or Firm* — Patterson + Sheridan, LLP

(57) ABSTRACT

Techniques for visualizing events in a distributed system are provided. One or more recordings identifying events occurring on a software agent are received, where two of the events occurred effectively simultaneously. A visualization showing a timeline for the software agent is generated, where the visualization represents the events as icons on the timeline based on times associated with the events, and where the visualization includes a stacked icon representing the two events that occurred effectively simultaneously. A request indicating the stacked icon is received, and the stacked icon is updated to present a semi-circle arrangement of icons representing the two events that occurred effectively simultaneously. A causal chain of events related to a first event corresponding to the stacked icon is determined, and the visualization is updated based on the causal chain of events to present an ordered sequence of events.

20 Claims, 11 Drawing Sheets

Related U.S. Application Data continuation of application No. 14/788,491, filed on Jun. 30, 2015, now Pat. No. 10,055,334.

(51) Int. Cl.
  *G06F 3/0481* (2013.01)
  *G06F 3/0484* (2013.01)
  *G06F 11/32* (2006.01)
  *G06F 11/34* (2006.01)

(52) U.S. Cl.
  CPC ........ *G06F 11/323* (2013.01); *G06F 11/3466* (2013.01); *G06F 11/3684* (2013.01); *G06F 11/3688* (2013.01)

(58) Field of Classification Search
  USPC .................................................. 717/109, 113
  See application file for complete search history.

(56) References Cited

U.S. PATENT DOCUMENTS

| | | | |
|---|---|---|---|
| 8,561,028 B1 | 10/2013 | Zuckerman | |
| 8,610,718 B2 | 12/2013 | Suntinger et al. | |
| 8,803,884 B2 | 8/2014 | Bradshaw et al. | |
| 8,806,355 B2 | 8/2014 | Twiss et al. | |
| 8,887,138 B2 | 11/2014 | Eker et al. | |
| 9,141,512 B2 | 9/2015 | Elia\u0161 et al. | |
| 9,519,682 B1 | 12/2016 | Pujara et al. | |
| 9,519,692 B2 | 12/2016 | Chow et al. | |
| 10,055,334 B2 | 8/2018 | Lentz et al. | |
| 10,083,107 B2 * | 9/2018 | Lentz | G06F 11/3664 |
| 2005/0246682 A1 | 11/2005 | Hines | |
| 2005/0288915 A1 | 12/2005 | Hines | |
| 2007/0206767 A1 | 9/2007 | Keren et al. | |
| 2007/0276631 A1 | 11/2007 | Subramanian et al. | |
| 2009/0043646 A1 | 2/2009 | Pingali et al. | |
| 2009/0100046 A1 | 4/2009 | Huck | |
| 2009/0287630 A1 | 11/2009 | Kaiser | |
| 2010/0295856 A1 | 11/2010 | Ferreira et al. | |
| 2011/0161730 A1 | 6/2011 | Van Der Merwe et al. | |
| 2011/0227925 A1 | 9/2011 | De Pauw et al. | |
| 2011/0283144 A1 | 11/2011 | Nano et al. | |
| 2011/0283239 A1 | 11/2011 | Krishnan et al. | |
| 2012/0072367 A1 | 3/2012 | Reisbich | |
| 2012/0102459 A1 | 4/2012 | Bates | |
| 2012/0102467 A1 | 4/2012 | Bates | |
| 2012/0117542 A1 | 5/2012 | Bates | |
| 2012/0266140 A1 | 10/2012 | Bates | |
| 2013/0014088 A1 | 1/2013 | Park et al. | |
| 2013/0031567 A1 | 1/2013 | Nano et al. | |
| 2013/0086501 A1 | 4/2013 | Chow et al. | |
| 2013/0104107 A1 | 4/2013 | De Smet et al. | |
| 2013/0290875 A1 | 10/2013 | Dixit et al. | |
| 2013/0335436 A1 | 12/2013 | Lindsey | |
| 2014/0098123 A1 | 4/2014 | Daynes et al. | |
| 2014/0114816 A1 | 4/2014 | Greef et al. | |
| 2014/0149924 A1 | 5/2014 | Sharp et al. | |
| 2014/0259573 A1 | 9/2014 | Kawaguchi | |
| 2014/0351650 A1 | 11/2014 | Elias et al. | |
| 2014/0359573 A1 | 12/2014 | Ajith Kumar et al. | |
| 2015/0052502 A1 | 2/2015 | Faillaci, III et al. | |
| 2015/0074471 A1 | 3/2015 | Sainath et al. | |
| 2015/0148138 A1 | 5/2015 | Rabin et al. | |
| 2015/0234582 A1 | 8/2015 | Badea et al. | |
| 2015/0286684 A1 | 10/2015 | Heinz et al. | |
| 2015/0355996 A1 | 12/2015 | Smith et al. | |
| 2016/0054981 A1 | 2/2016 | Cao et al. | |
| 2016/0124834 A1 | 5/2016 | Davis et al. | |
| 2016/0171640 A1 | 6/2016 | Ajith Kumar et al. | |
| 2016/0191365 A1 | 6/2016 | Wakeman et al. | |
| 2016/0196198 A1 | 7/2016 | Kumar et al. | |
| 2016/0266752 A1 * | 9/2016 | Wu | G06Q 30/016 |
| 2016/0292061 A1 | 10/2016 | Marron et al. | |
| 2017/0004067 A1 | 1/2017 | Lentz et al. | |
| 2017/0199806 A1 | 7/2017 | Dahan et al. | |
| 2017/0228305 A1 | 8/2017 | Krishnan et al. | |

OTHER PUBLICATIONS

Suntinger et al.; "The Event Tunnel: Interactive Visualization of Complex Event Streams for Business Process Pattern Analysis", Visualization Symposium, 2008 PacificViS'08 IEEE Pacific, Mar. 5-7, 2008, pp. 111-118.

Jialin et al.; "Research on Real-Time Data Processing of Visual Production System Based on Event-Driven", Industrial Electronics and Applications (ICIEA), 2012 IEEE 7th Conference on, Jul. 18-20, 2012, pp. 1906-1911.

Kwon et al.; "A Unified Framework for Event Summarization and Rare Event Detection From Multiple Views", Pattern Analysis and Machine Intelligence, Submission on IEEE Transactions on, vol. PP, Issue 99, Dec. 23, 2014, pp. 1-14.

Phang, Khoo Yit, Expositor: Scriptable Time-Travel Debugging with First-Class Traces, Software Engineering (ICSE), 2013 35th International Conference on, May 18-26, 2013, pp. 352-361.

Microsoft, "Interactive Timeline Business Data Visualization," Microsoft Dynamics NAV 2013, downloaded from <https://msdn.microsoft.com/en-us/library/hh168730(v=nav.70).aspx> on Jun. 30, 2015, 1 page.

Murillo et al., "MPSoC Software Debugging on Virtual Platforms via Execution Control with Event Graphs", ACM, vol. 16, No. 1, Article 7, Oct. 2016, pp. 7:1-7:25; <https ://dl.acm.org/citation.cfm?id=2950052&C FI D=844321588&C FT OKEN =45899505>.

Lai et al., "milliScope: a Fine-Grained Monitoring Framework for Performance Debugging of n-Tier Web Services", IEEE, Jul. 2017, pp. 92-102; <http ://i eeexp lo re. i eee. org/stampfstamp .jsp ?tp=&arnu mber = 7979958>.

Aguilar et al., "Visual MPI Performance Analysis using Event Flow Graphs", Elsevier, vol. 51, Sep. 2015, ICCS 2015, pp. 1353-1362; <http://www.sciencedirect.com/science/article/pii/S1877050915011308>.

Zhang et al., "Pensieve: Non-Intrusive Failure Reproduction for Distributed Systems using the Event Chaining Approach", ACM, SOSP'17, Oct. 2017, pp. 19-33; <https://dl.acm.org/citation.cfm?id=3132768 >.

Lonnberg et al., "Visualising Concurrent Programs with Dynamic Dependence Graphs", IEEE, Sep. 2011. pp. 1-4; <https ://ieeexplore.ieee.org/docu ment/6069456/>.

Aguerre et al., "Fully-Distributed Debugging and Visualization of Distributed Systems in Anonymous Networks", HAL, hal 00697093, May 2012, pp. 1-12; <https://hal.archives-ouvertes.fr/hal-00697093/document>.

IBM, 'List of IBM Patents or Patent Applications Treated As Related,' for U.S. Appl. No. 16/117,101, filed Aug. 30, 2018.

* cited by examiner

600

DEBUGGING THROUGH CAUSALITY AND TEMPORAL PATTERING IN A EVENT PROCESSING SYSTEM

CROSS-REFERENCE TO RELATED APPLICATIONS

This application is a continuation of co-pending U.S. patent application Ser. No. 14/817,514 filed Aug. 4, 2015, which is a continuation of U.S. patent application Ser. No. 14/788,491 filed Jun. 30, 2015 now U.S. Pat. No. 10,055,334. The aforementioned related patent applications are herein incorporated by reference in their entirety.

BACKGROUND

The present invention relates to computer software, and more specifically, to embodiments disclosed herein relate to computer software for debugging though causality and temporal patterning in an event processing system.

Event processing systems may operate in a large scale, distributed computing environment with multiple agents and events distributed across multiple computing nodes. Distributed instances of software agents may receive and evaluate a variety of events based on various processing rules. Such agents may also interact in real-time to direct the flow of events through such systems. Such an architecture allows for flexibility and capability to quickly scale as needs change. Troubleshooting and debugging such systems may be difficult. Determining a chain of events that lead to particular outcomes based on traditional debugging techniques, such as through inspection of log files is complicated by the large number of relationships possible and the number of events, agents and interactions between events and agents. What is needed is a way to visualize and debug complex event chains in context with the causality and temporal patterning in an event processing system.

SUMMARY

According to one embodiment disclosed herein, a method is provided. The method includes receiving one or more recordings identifying a plurality of events occurring on a first software agent, wherein at least two of the plurality of events occurred effectively simultaneously. The method further includes generating a visualization showing a timeline for the first software agent, wherein the visualization represents the plurality of events as icons on the timeline based on times associated with the plurality events, and wherein the visualization includes a stacked icon representing the at least two of the plurality of events that occurred effectively simultaneously. Additionally, the method includes receiving a request indicating the stacked icon in the visualization, and updating the stacked icon to present a semi-circle arrangement of icons representing the at least two of the plurality of events that occurred effectively simultaneously. The method also includes determining a causal chain of events related to a first event corresponding to the stacked icon, and updating the visualization based on the causal chain of events to present an ordered sequence of events in the causal chain of events that occurred relative to the first event.

According to a second embodiment disclosed herein, a system is provided. The system includes one or more computer processors, and a memory containing a program which when executed by the one or more computer processors performs an operation. The operation includes receiving one or more recordings identifying a plurality of events occurring on a first software agent, wherein at least two of the plurality of events occurred effectively simultaneously. The operation further includes generating a visualization showing a timeline for the first software agent, wherein the visualization represents the plurality of events as icons on the timeline based on times associated with the plurality events, and wherein the visualization includes a stacked icon representing the at least two of the plurality of events that occurred effectively simultaneously. Additionally, the operation includes receiving a request indicating the stacked icon in the visualization, and updating the stacked icon to present a semi-circle arrangement of icons representing the at least two of the plurality of events that occurred effectively simultaneously. The operation also includes determining a causal chain of events related to a first event corresponding to the stacked icon, and updating the visualization based on the causal chain of events to present an ordered sequence of events in the causal chain of events that occurred relative to the first event.

According to a third embodiment disclosed herein, a computer program product is provided. The computer program product comprises a computer readable storage medium having computer-readable program code embodied therewith, the computer-readable program code executable to perform an operation. The operation includes receiving one or more recordings identifying a plurality of events occurring on a first software agent, wherein at least two of the plurality of events occurred effectively simultaneously. The operation further includes generating a visualization showing a timeline for the first software agent, wherein the visualization represents the plurality of events as icons on the timeline based on times associated with the plurality events, and wherein the visualization includes a stacked icon representing the at least two of the plurality of events that occurred effectively simultaneously. Additionally, the operation includes receiving a request indicating the stacked icon in the visualization, and updating the stacked icon to present a semi-circle arrangement of icons representing the at least two of the plurality of events that occurred effectively simultaneously. The operation also includes determining a causal chain of events related to a first event corresponding to the stacked icon, and updating the visualization based on the causal chain of events to present an ordered sequence of events in the causal chain of events that occurred relative to the first event.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein provide techniques for debugging through causality and temporal patterning in an event processing system. In one embodiment, an event processing system executes in a distributed computing cluster. Event processing systems executing in such distributed computing environments are capable of sensing events and responding in real time, allowing for adaptive decision making. For example, a financial institution may use an event processing system for fraud detection by monitoring, in real time, customer financial transactions looking for signs of fraud and taking actions based on the monitoring. Sensors and/or software generate messages known as events. These events are received by distributed processing units, or agents, which evaluate a set of rules to process the events and perform actions based on the rules. These actions may include firing other event messages or initiating additional processing by other applications or services. Processing events by agents may be distributed among multiple computing nodes across multiple agents.

The distributed event processing application may receive events from any number of sources in real time and operate on very large data sets. For example, in the fraud detection case, the number of customer transactions scales up rapidly as the number of customers increases as each customer may perform many transactions for a given time period. Troubleshooting or debugging such systems through traditional debugging techniques is complicated by due to the size and complexity of these systems. Complex event analysis may require numerous layered agents operating in a chain of events. In the fraud detection example, various agents may be used to monitor for specific types of transactions that individually are innocuous, but taken together suggest fraudulent activity on an account. Traditional debugging does little to help determine these relationships. Further, events may be linked to real-time operations. For example, there may be a significant amount of intervening time between the multiple transactions that together suggest fraudulent activity on an account. A visualization system capable of identifying and correlating multi-layered relationships to show causations throughout a timescale for debugging allows a user to more easily pin down and identify issues that may arise.

Figure 1:
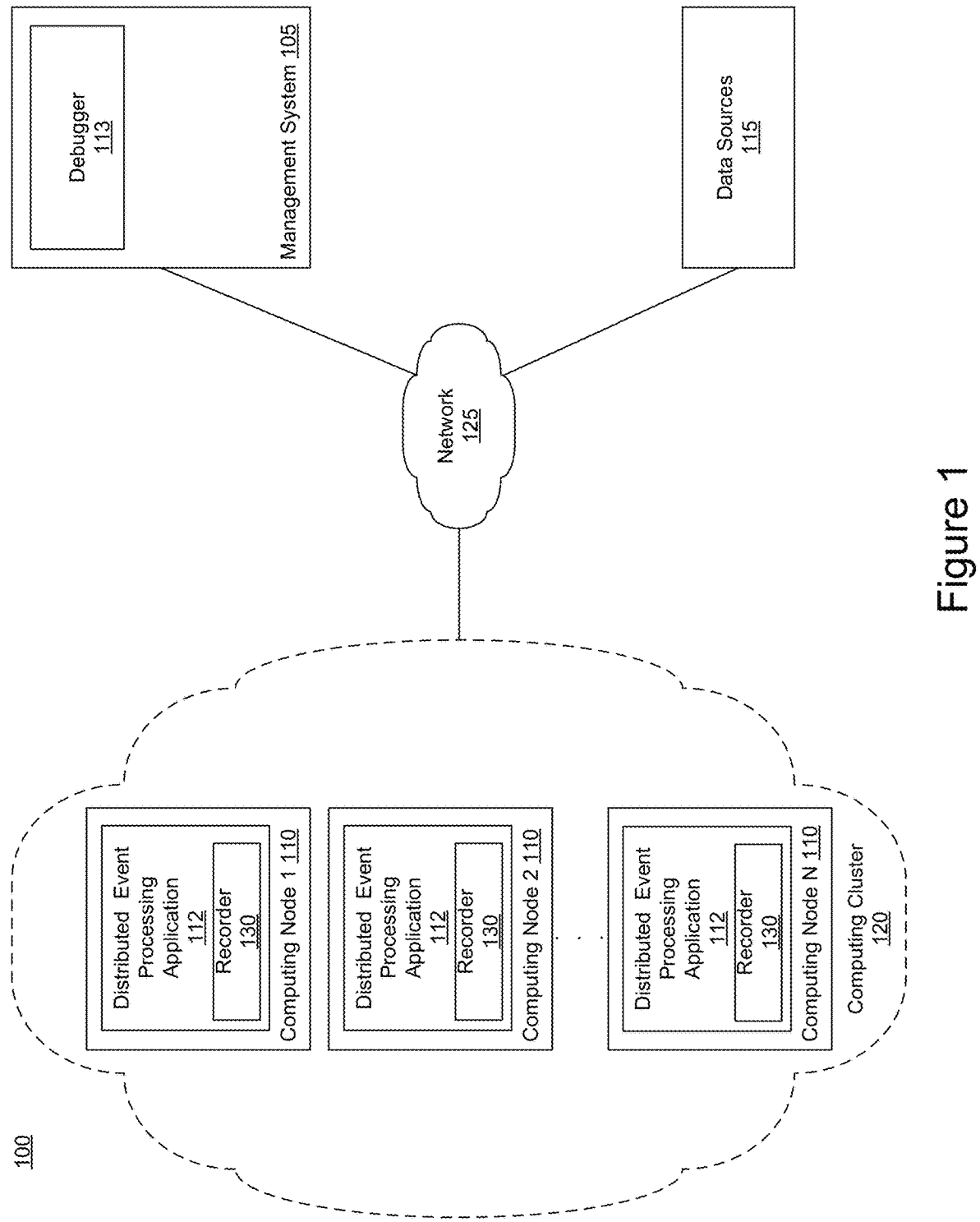
FIG. 1 illustrates an example computing environment, according to one embodiment.

FIG. 1 illustrates an example computing environment 100, according to one embodiment. As shown, computing environment 100 includes a computing cluster 120, a management system 105, and data sources 115. Data sources 115 may be any number of source systems which generate or store input data. The computing cluster 120, management system 105, and data sources 115 are each connected via a network 125, such as the internet, a local area network (LAN), or a computer bus.

As shown, the computing cluster 120 includes a set of computing nodes 110. Each computing node 110 may be a physical computing system, a virtual machine instance executing in a cloud computing environment, or a process running on a computer. The computing nodes 110 each execute components of a distributed event processing application 112. The distributed event processing application 112 executes particular instances of the distributed event processing application 112, which may comprise one or more particular agents. The distributed event processing application 112 may be specific for each computing node 110 or distribute multiple instances of the event processing application across the computing nodes 110. The distributed event processing application 112 receives input events from various data sources 115, e.g., over the network 125. Examples of such data include message data (e.g., MQTT messages), XML documents, biometric data captured from an individual in real-time, etc. The distributed event processing application 112 may utilize the computing nodes 110 to analyze and process the input events. Output from a particular portion of the distributed event processing application 112 may be used as input by other portions of the distributed event processing application 112.

In one embodiment, the computing environment 100 includes the management system 105, which may be a physical computing system, a virtual machine instance in a cloud environment, a process running on a computer, and/or as distributed components executing on the computing nodes. As shown, the management system 105 includes a debugger 113. The debugger 113 allows a developer to locate relationships that may occur during runtime of the distributed event processing application 112. In one embodiment, the debugger 113 communicates via the network 125 with the distributed event processing applications 112. The distributed event processing applications 112 may include a recorder 130, which records information related to events received, processed, and/or emitted by agents at a given node. The recording information may be in a human readable format and may include time indicators related to receiving, processing, and outputting of events. The recording information may then be relayed to the debugger 113 for processing and analysis.

Figure 2:
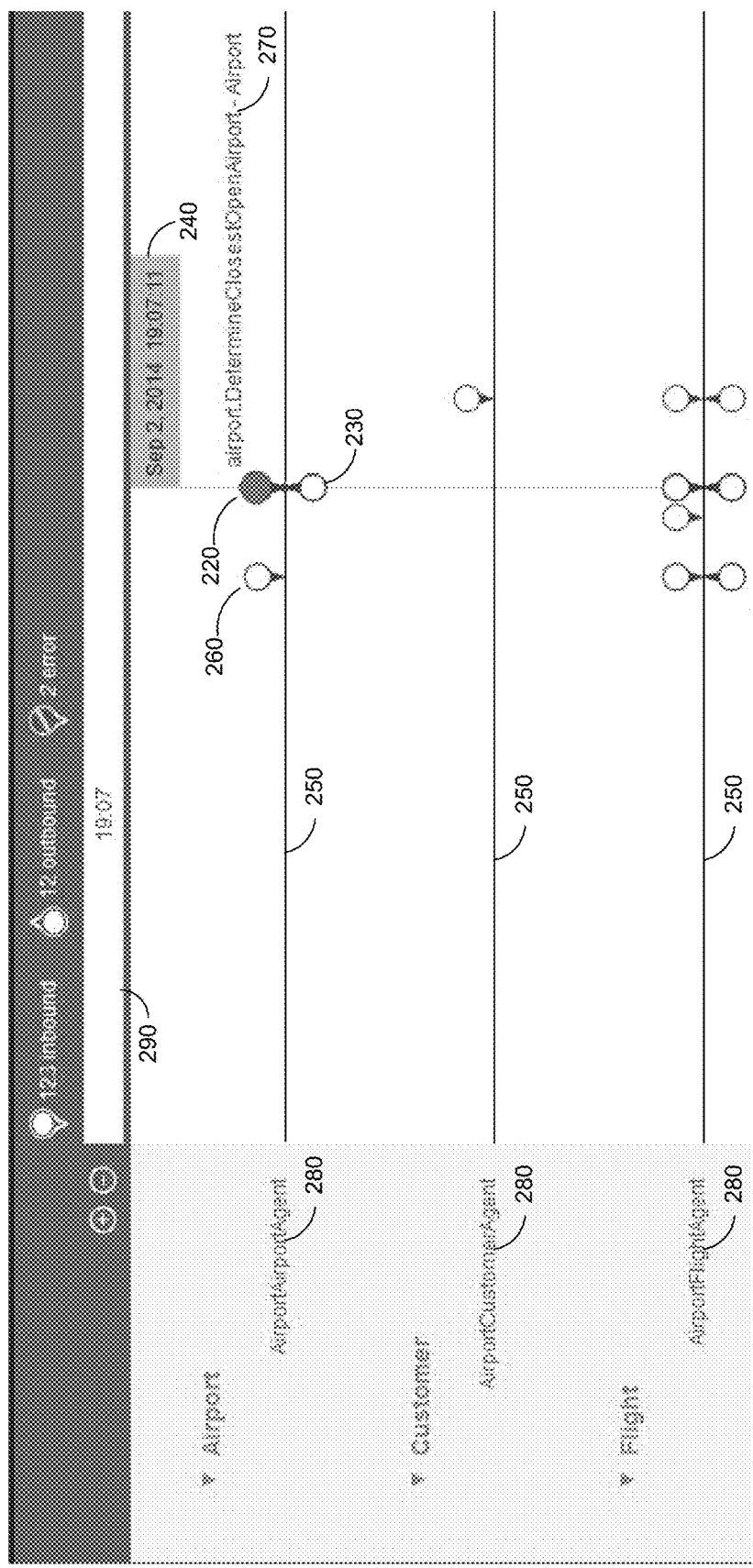
FIG. 2 illustrates a timeline UI for debugging through causality and temporal patterning in an event processing system, according to one embodiment.

FIG. 2 illustrates a timeline UI 200 for debugging through causality and temporal patterning in an event processing system, according to one embodiment. The timeline UI 200 represents agents 280 operating on agent timelines 250. As shown, agent timelines 250 are aligned chronologically from left to right along an adjustable time scale 290. Event processing is represented by icons on the timeline being absorbed or emitted by the agents. Icons above the timeline 250 represent inbound events 220 for an agent 280, and icons below the agent timeline 250 represent outbound events 230. Some inbound events 260 may not result in an outbound event being emitted. Where an inbound event 220 results in an outbound even being emitted 230 after processing by an agent, the inbound and outbound events are linked. This linking allows a user to quickly determine if there are missing output events and correlate received events with output events. Linked events are shown aligned vertically based on the inbound event. When user selects an inbound event 220, the time 240 the inbound event 220 was received by the agent is displayed along with information 270 about the agent. In some cases, the linked events may also be highlighted to further indicate the relationship between the inbound and outbound events. Additional information about the agent may be displayed along with the timeline UI.

Figure 3:
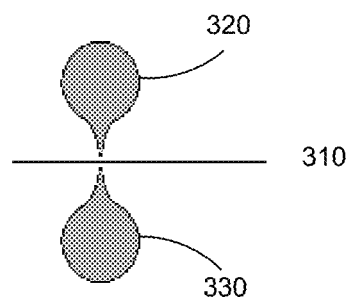
FIG. 3 illustrates an event flow in relation to an agent, according to one embodiment.

FIG. 3 illustrates an event flow in relation to an agent, according to one embodiment. As discussed above, inbound events 320 may be represented by an icon on the agent timeline being absorbed by the agent at a particular time on the agent timeline 310. Outbound events 330 may be emitted by an agent and appear as a reflection across the agent timeline 310 from the corresponding inbound event. For practical purposes, the inbound and outbound events may appear to occur at substantially the same time. In some cases, an outbound event may occur at a later time than the inbound event and be displayed on the agent timeline at a later time. Linking the inbound and outbound events provides causal information, indicating to the user what events caused a particular agent to output, or not output an event, or if the agent properly received an event. This causal information enables a user to more quickly correlate the inbound and outbound events and notice missing or extraneous events without having to parse or trace through log files. For example, a missing output event icon for a particular event expected to cause an agent to generate an output event highlights the failure of the agent to do so. This causal information may also be used to build causal flows of related inbound and outbound events.

Figure 4:
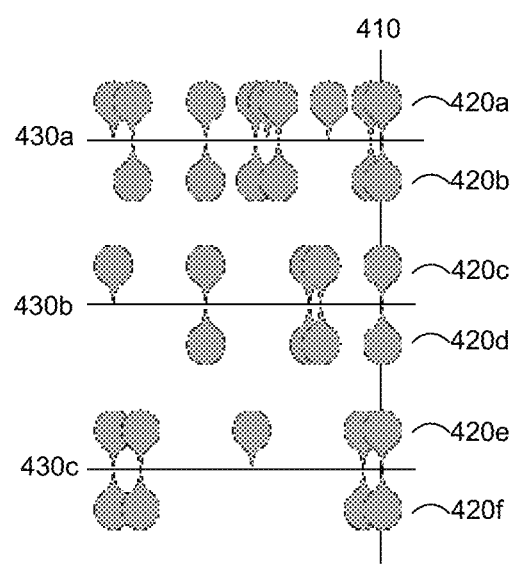
FIG. 4 illustrates a time horizon, according to one embodiment.

FIG. 4 illustrates a time horizon, according to one embodiment. As shown, time horizon cursor 410 is represented as a vertical line through the agent timelines 430. The time horizon cursor 410 may be used to examine the flow of events in and out of a set of agents at a particular point in time. For example, a fraud checking event processing application may include an agent with rules directed to the location a transaction occurs as well as an agent with rules directed to the amount of a given transaction. When the transaction is initiated, both agents may receive events effectively at the same time. For example, timelines 430a, 430b and 430c, receive events 420a, 420c, and 420e at effectively the same time. Multiple events 420a-430f occurring at effectively the same point in time may be revealed by the time horizon cursor 410 even when they occur for multiple agents 430a-430b. This time horizon cursor 410 may orient a user to a particular point in time for debugging the processing of events. For example, the time cursor 410 provides a reference point across multiple agents and may help highlight situations where multiple events at different agents occur effectively simultaneously.

Figure 5:
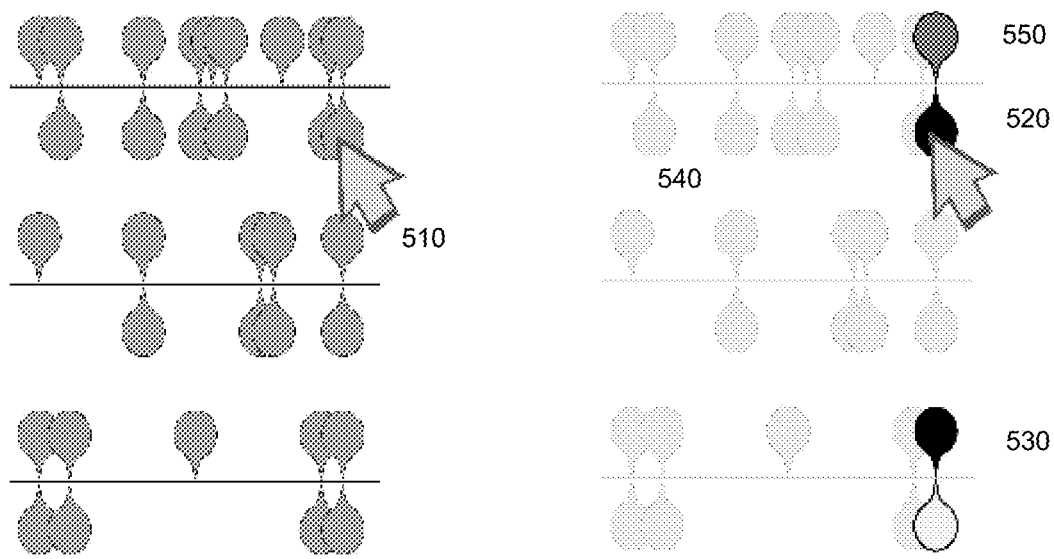
FIG. 5 illustrates a visualization of an instant causal chain, according to one embodiment.

While time cursors assist users in identifying a group of related events that occur at a specific point in time, time cursors do not generally reveal details about causal chains between events. Events emitted form one agent may be consumed by another agent in a causal chain or flow. For example, an agent of the fraud checking event processing application may look for gas station transactions and emit an event when such a transaction is detected. This emitted event may then be consumed by another agent that checks the amount of the transaction looking for nominal transaction amounts. A single event may be consumed by multiple agents and in any order. For example, FIG. 5 illustrates a visualization of an instant causal chain, according to one embodiment. As shown, a cursor 510 is used to select a particular event on a timeline. Selecting a particular event may cause the UI to highlight other events which are related to the selected one at that time. For example, where an outbound event 520 is selected, if the indicated outbound event 520 is consumed by another agent, that inbound event 530 may also be highlighted. Where multiple agents consume an outbound event, the inbound event of each consuming agent may also be highlighted. Similarly, where the inbound event 530 is indicated, if the inbound event 530 was emitted by another agent, the corresponding outbound event 520 may be highlighted. Additionally, for an indicated outbound event 520, the corresponding inbound event 540, processed by the agent and resulting in the outbound event, may also be highlighted. This highlighting may be a different color or shading than the highlighting used in the outbound event 520. Similarly, for an indicated inbound event 530, the corresponding outbound event 550 caused from the processing of the inbound event 530 may also be highlighted. This highlighting may be indicated by an unfilled icon or with a different color or shade from the other highlighting. The highlighting of the related events at a particular point in time helps draw out relationships that may otherwise be difficult to spot, such as where an outbound event is consumed by another agent or if a consumed inbound event was emitted by another agent. Further highlighting of the causal chain may be achieved by fading other events 560 not associated with the particular causal chain into the background.

Figure 6:
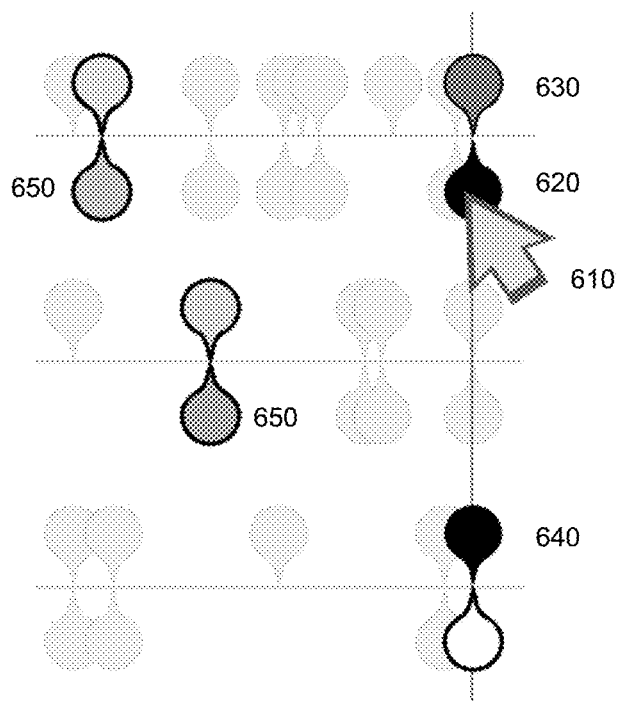
FIGS. 6 and 6A illustrate example temporal causal chains, according to some embodiments.
Figure 6A:
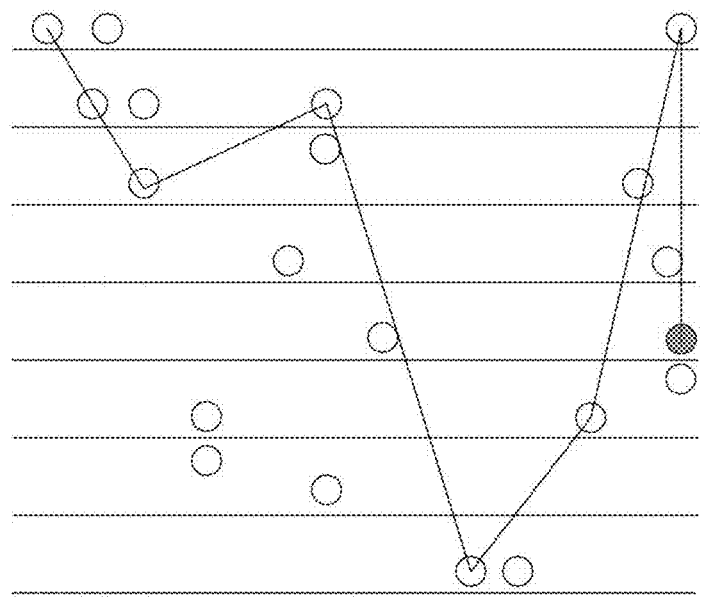

In some cases, the events that are related may occur at different times. Returning to the fraud checking example, an agent or set of agents may be checking for gas station transactions of a nominal amount and emit an event when such transactions occur. This event may not be immediately consumed. Rather the event may be consumed where another, high dollar transaction is detected afterwards. The resulting causal chain for such a transaction occurs across a span of time and agents as an event is emitted by one agent is later consumed by another agent, which then emits a second event, and so forth. For example, FIG. 6 illustrates an example temporal causal chain 600, according to one embodiment. A cursor 610 is used to select or otherwise indicate a particular event. Selecting an event may cause the UI to highlight other events which are related to the selected event, even when those events occur at an earlier or later point in time. For example, selecting outbound event 620 may highlight not only the causing inbound event 640 and consuming inbound event 630, but also previous events 650 which lead up to and are linked to inbound event 640. Other events 660 which are not related to the selected causal chain may be faded into the background. Other indicators may also be provided to select causal chains, such as connecting lines between events, as shown in FIG. 6a. Representing a causal chain over time draws out relationships between events that happen at different times and indicates to the user the events that caused or is the result of a particular event, allowing the user to trace causal chains.

Figure 7D:
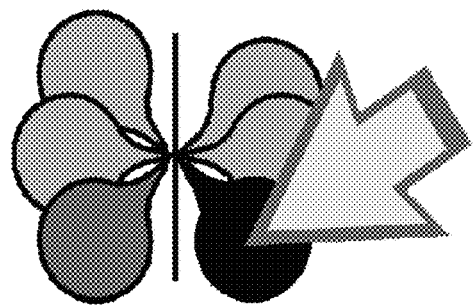
FIG. 7A-7E illustrates various representations of simultaneous events, according to one embodiment.
Figure 7C:
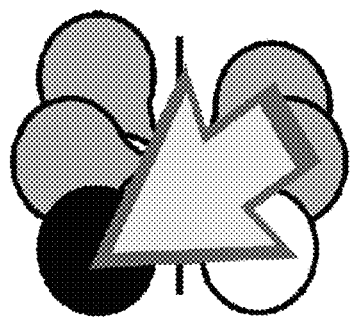
Figure 7E:
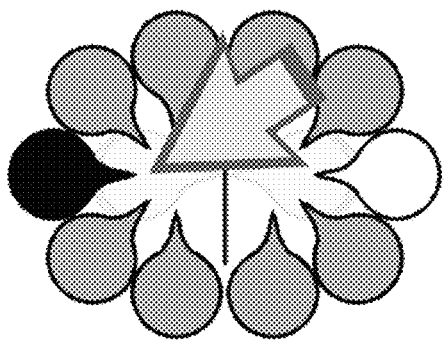
Figure 7B:
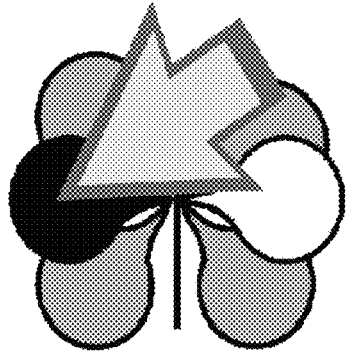
Figure 7A:
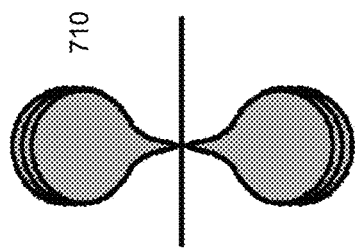

FIG. 7A-7E illustrates various representations of simultaneous events, according to one embodiment. As discussed above, agents may be distributed across multiple computing nodes and thus subject to network latencies. Additionally, events may originate from a variety of sources, which may also introduce latencies or timing issues. As such, multiple events occurring within a small interval of time may be treated as occurring effectively simultaneously. In such a case, the agent timeline may stack inbound and outbound events which occur at effectively the same time. For example, FIG. 7A illustrates icon stack 710 showing a group of events delivered to an agent at substantially the same time. Stack 710 may be representative of the actual number of effectively simultaneous events or there only one icon that represents stacked events. The number of stacked events is not revealed unless the stacked event icon is selected as in FIG. 7B. Once selected, stacked icons may fan out to reveal each individual event icons for inbound and/or outbound events in the stack. Inbound events and corresponding outbound events may be aligned such that they are displayed in a vertically aligned fashion when linked. When one of the stacked inbound events is selected, the corresponding outbound event may also be selected, as in FIGS. 7B and 7C. Likewise, when an outbound event is selected, the corresponding inbound event may also be selected, as in FIG. 7D. Where stacked events are a part of a causal chain, additionally highlighting or connecting lines may be shown to indicate the related events. Information related to the selected event may also be displayed in a separate dialog or pane. Many other embodiments are also possible. For example, in FIG. 7E, the semi-circle fan of multiple event icons may be expanded to fit the number of effectively simultaneous events. Alternatively, selecting a stack may not utilize a fanned stack of icons, but rather bring up a dialog or pane displaying the individual events.

Figure 8:
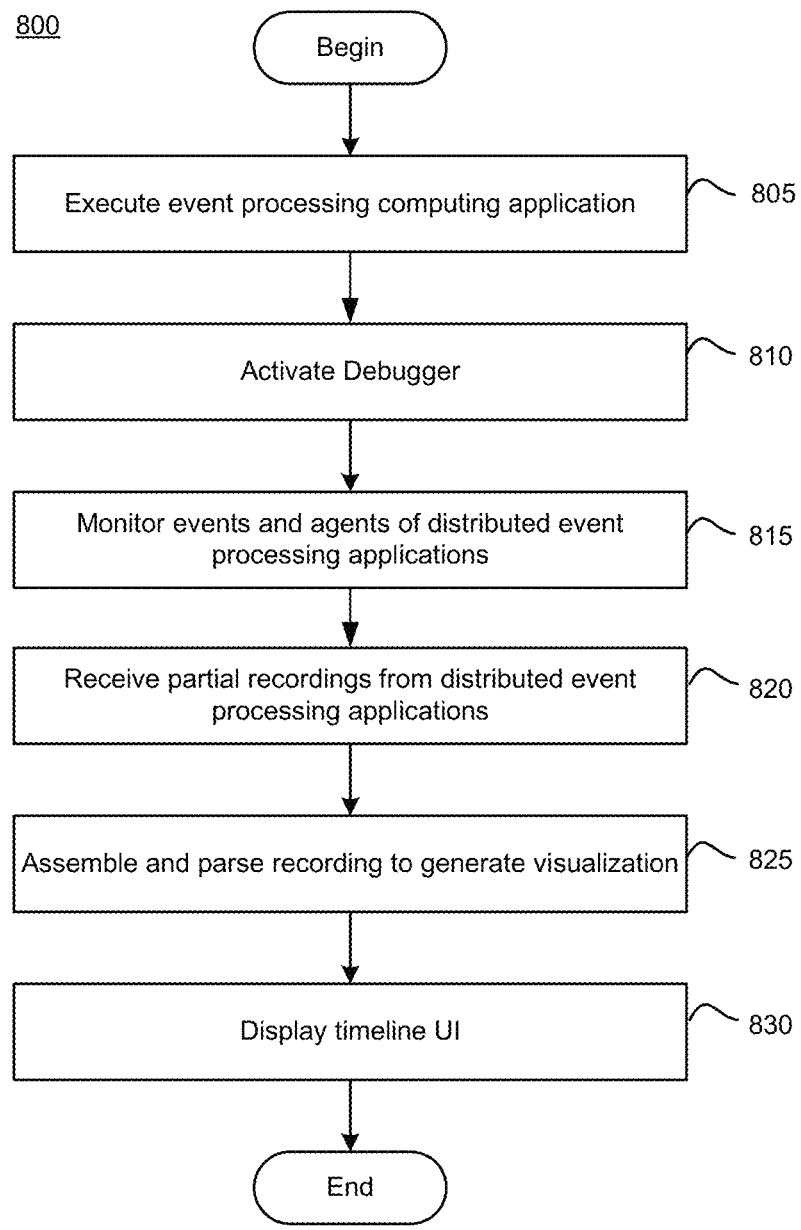
FIG. 8 is a flow diagram illustrating a method for displaying a timeline UI, according to one embodiment.

FIG. 8 is a flow diagram illustrating a method 800 for displaying a timeline UI, according to one embodiment. As shown the method 800 begins at step 805, where the distributed event processing computing application is executed. As discussed above, computing nodes may be separate physical computers executing instances of the distributed event processing computing application, which communicate with each other over a network. The computing nodes may also communicate with a management system. The management system may provide various functionality, including debugging as well as determining and visualizing temporal causal chains. At step 810, the debugger is activated on the management system. Due to the real time and time-dependent processes involved in a distributed event processing system implemented using a collection of agents which process inbound events and emit outbound events, a recording of the execution of the distributed event processing application may be used to present a timeline interface that can highlight the temporal and causality relationships between events processed by the agents. In one embodiment, the debugger may communicate with the computing nodes and activate a recorder for each computing node monitoring the execution of the distributed event processing application on the computing node. At step 815, the events processed by each agent in the distributed event processing application for the computing node is monitored by the recorder. The recorder monitors and records information relating to execution of agents on the computing node along with events consumed and emitted. This partial recording may or may not be in a human-readable format and may be locally stored at the computing node while recoding is ongoing. At step 820, the debugger may receive the partial recording from the computing nodes. In some embodiments, the computing nodes may store partial recording later sent to the management system. In other embodiments the computing nodes may transmit the partial recordings to the management system while monitoring, for example, as a data stream, or in batches. At step 825, the debugger assembles and parses the recording to generate a visualization that presents a temporal chain of events related to a selected event. Step 825 is discussed in greater detail with reference to FIG. 9. At step 830, the timeline UI is displayed with the agent timelines displayed on the horizontal axis. Step 830 is discussed in greater detail with reference to FIG. 10.

Figure 9:
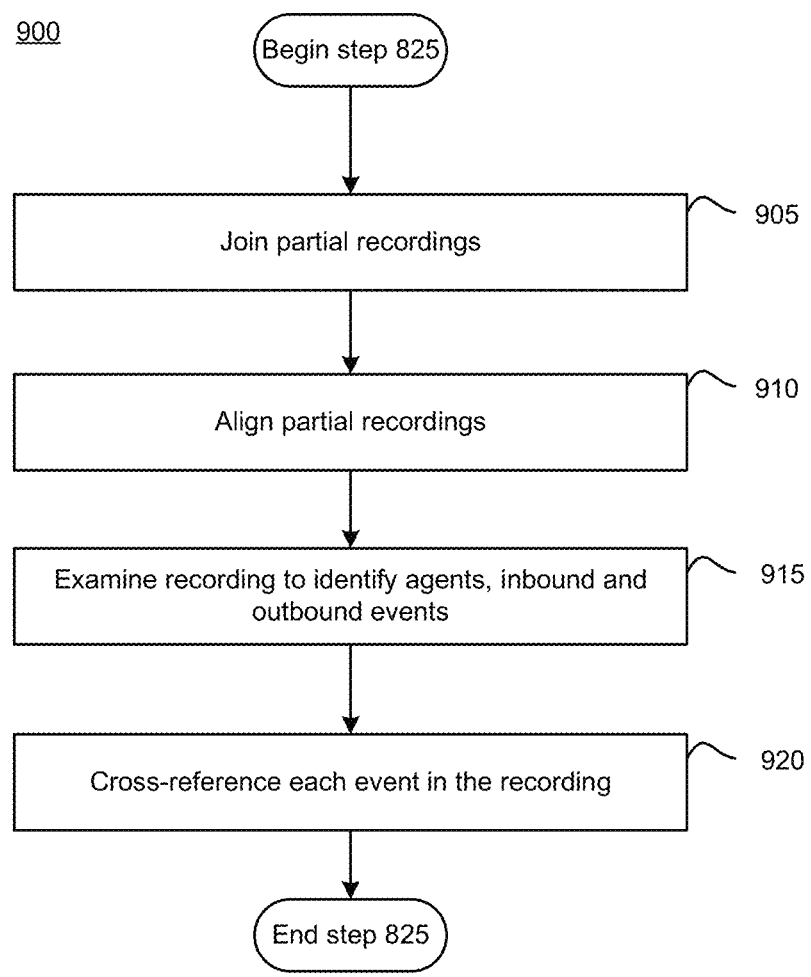
FIG. 9 is a flow diagram illustrating a method for assembling and parsing a recording of events, according to one embodiment.

FIG. 9 is a flow diagram illustrating a method 900 for assembling and parsing a recording of events processed by a collection of agents in a distributed event processing application, according to one embodiment. At step 905, the partial recording from a computing node may be joined with partial recordings from the other nodes into a recording. The information, for example, may be loaded into an in-memory data structure, database, or other searchable data container. Each recording may be loaded into separate data containers or a single data container with multiple sub-partitions. At step 910, the recording from each node is compared to each other to align the recordings. As the recordings may be made by distributed computing nodes, not all nodes may receive a command to start monitoring at the same time and not all recordings may span the same timeframe. Data from time periods that are not recorded by every computing node may be ignored or otherwise omitted. Additionally, as events that occur within a small interval may be treated as simultaneous, monitoring on the computing nodes may include marker events or other timing and/or synchronization markers to aid in aligning the records. At step 915, the recording from each computing node is examined to identify information regarding agents as well as inbound and outbound events. This information may include details relating to the operations of each agent, such as the inbound event received, the rules applied in processing the event, as well as any corresponding outbound event emitted as a result. Timing information related to when the inbound event is received may also be included. At step 920, the debugger may then cross-reference each event in the recoding. For example, each identified inbound event for each agent may be cross referenced with the identified emitted events for all other agents that occurred at the same or earlier point in time to determine whether an emitted outbound event matches with the consumed inbound event. Cross referencing may be performed based on event identifiers, time stamps, globally unique identifiers, and the like. Matches indicate that an emitted outbound event was consumed by the matched inbound event and may be marked or otherwise noted. Likewise, each identified outbound event may be cross reference with inbound events that occurred at the same point or later in time to look for matching sets.

Figure 10:
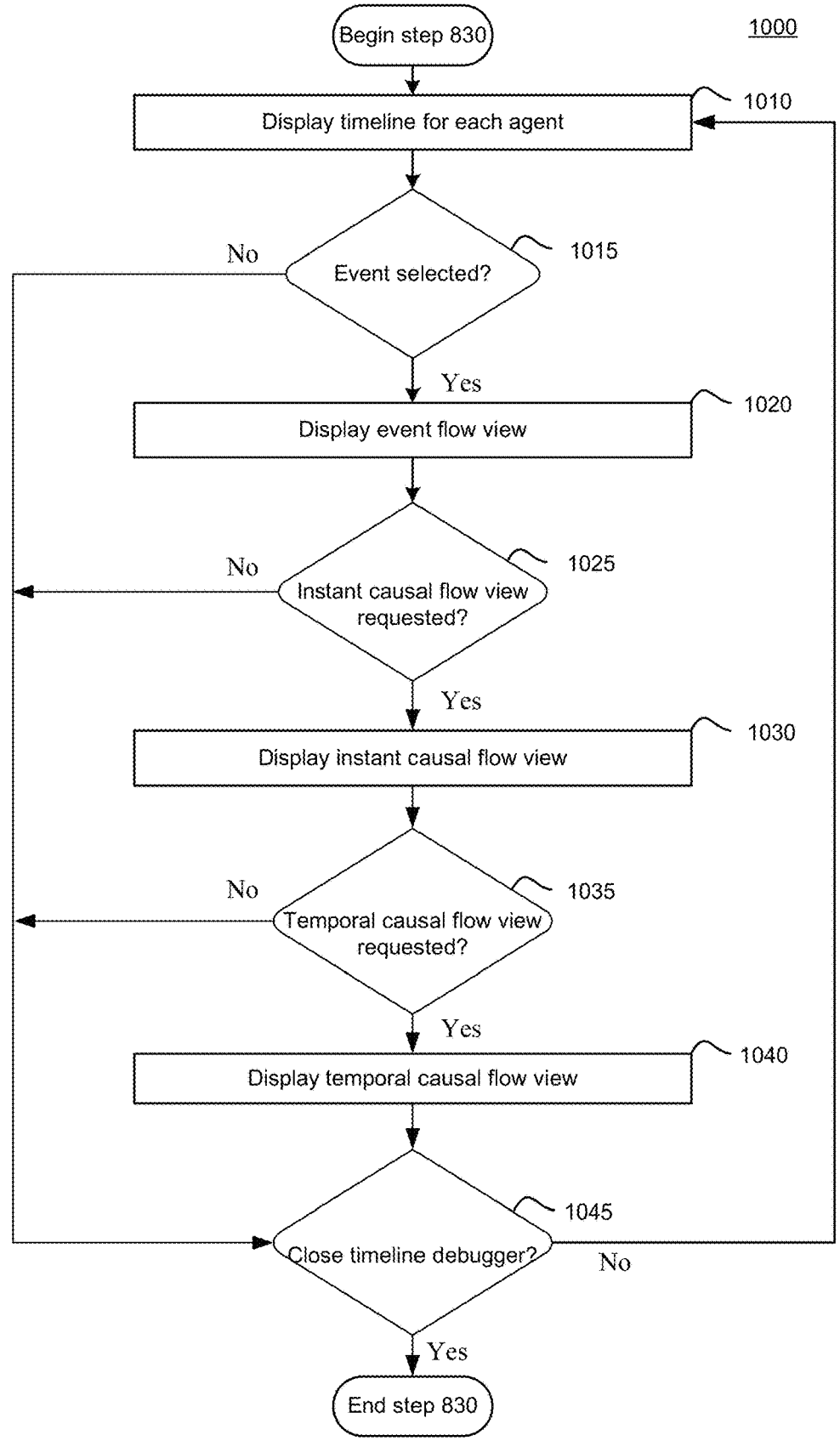
FIG. 10 is a flow diagram illustrating a method for displaying the timeline UI, according to one embodiment.

FIG. 10 is a flow diagram illustrating a method 1000 for displaying the timeline UI, according to one embodiment. As distributed event processing applications may include lengthy multi-layered event flows, users may not always want the level of detail afforded by certain views. As such, a mechanism for allowing switching between a view of an event flow, time horizon view, and the causal flows may be provided. At step 1010, an agent timeline for each agent is displayed. The agent timeline may place icons corresponding to each received inbound event based on the time the inbound event was received above the agent timeline. Icons representing corresponding to outbound events may also be placed below the agent timeline. At step 1015, a determination is made as to whether an event is selected. For example, an event may be selected though mouse selections, key command, touch, etc. At step 1020, an event flow view, such as in FIG. 2, may be displayed corresponding to the selected event. Where a selected event results from, or results in, a corresponding reflected event (for example, a consumed inbound event resulting in the selected outbound event), that corresponding mirrored event may be highlighted. A time horizon cursor corresponding to the time of the selected event may be displayed. Additionally, information about the selected event may be displayed in a separate dialog or panel apart from the timeline UI. At step 1025, a determination is made as to whether an instant causal flow view, such as in FIG. 5, is requested. For example, a second/right click, key command, menu selection, etc. may be received requesting an instant causal flow view for an event. At step 1030, the instant causal flow view may be displayed. When a particular event is selected, related events at a particular point in time are highlighted. For example, for an selected outbound event, an inbound event at another agent consuming the selected outbound event may be highlighted. At step 1035, a determination is made as to whether a temporal causal flow view is requested. For example, a third click, key command, menu selection, etc. may be received requesting a temporal causal flow view, such as in FIG. 6, for an event. At step 1040, the temporal causal flow view may then be displayed. At 1045, a determination is made as to whether the timeline debugger may be closed. If the timeline debugger is closed, the steps end.

Figure 11:
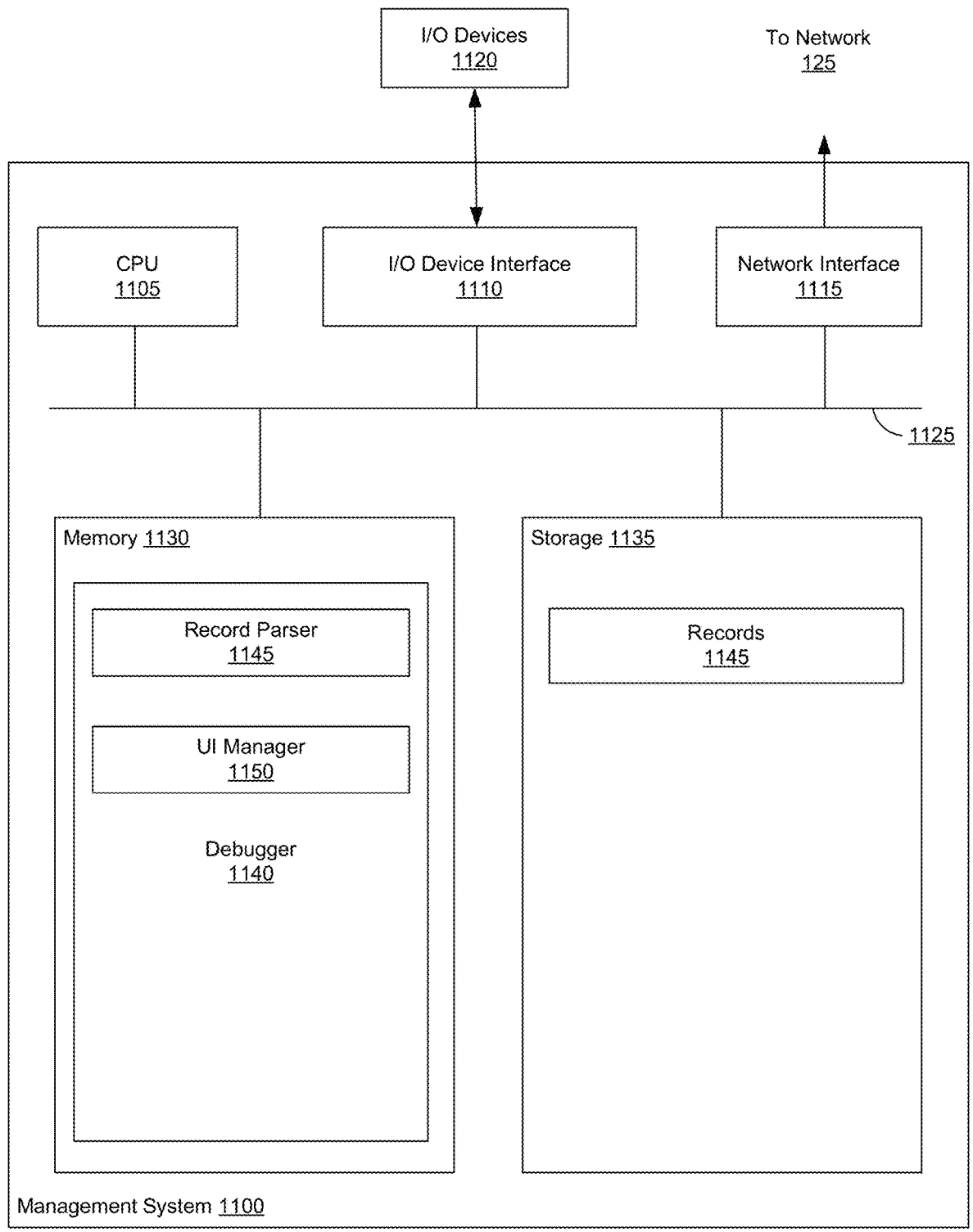
FIG. 11 illustrates the management system, in accordance with certain aspects of the present disclosure.

FIG. 11 illustrates the management system 105 of FIG. 1, in accordance with certain aspects of the present disclosure. As shown, management system 1100 includes, without limitation, a CPU 1105, a network interface 1115, an interconnect 1125, a memory 1130, and storage 1135. The management system 1100 may also include an I/O device interface 1110 connecting I/O devices 1120 (e.g., keyboard, display and mouse devices) to the management system 1100.

The CPU 1105 is configured to retrieve and execute programming instructions stored in the memory 1130 and storage 1135. Similarly, the CPU 1105 is configured to store and retrieve application data residing in the memory 1130 and storage 1135. The interconnect 1125 is configured to move data, such as programming instructions and application data, between the CPU 1105, I/O devices interface 1110, storage unit 1135, network interface 1115, and memory 1130. The CPU 1105 is included to be representative of a single CPU, multiple CPUs, a single CPU having multiple processing cores, and the like. Memory 1130 is generally included to be representative of a random access memory. The network interface 1115 is configured to transmit data via the communications network 125. Although shown as a single unit, the storage 1135 may be a combination of fixed and/or removable storage devices, such as fixed disc drives, removable memory cards, optical storage, SSD or flash memory devices, network attached storage (NAS), or connections to storage area-network (SAN) devices.

As shown, the memory 1130 contains a debugger 1140. The debugger 1140 may communicate with the computing nodes via the network 125 and coordinate monitoring of agents and events in order to create records. Additionally, the storage 1135 includes records 1145 received from computing nodes over the network 125. The debugger includes a record parser 1145 and a UI manager 1150. The record parser 1145 may parse records 1145 for display by the UI manager 1150.

Figure 12:
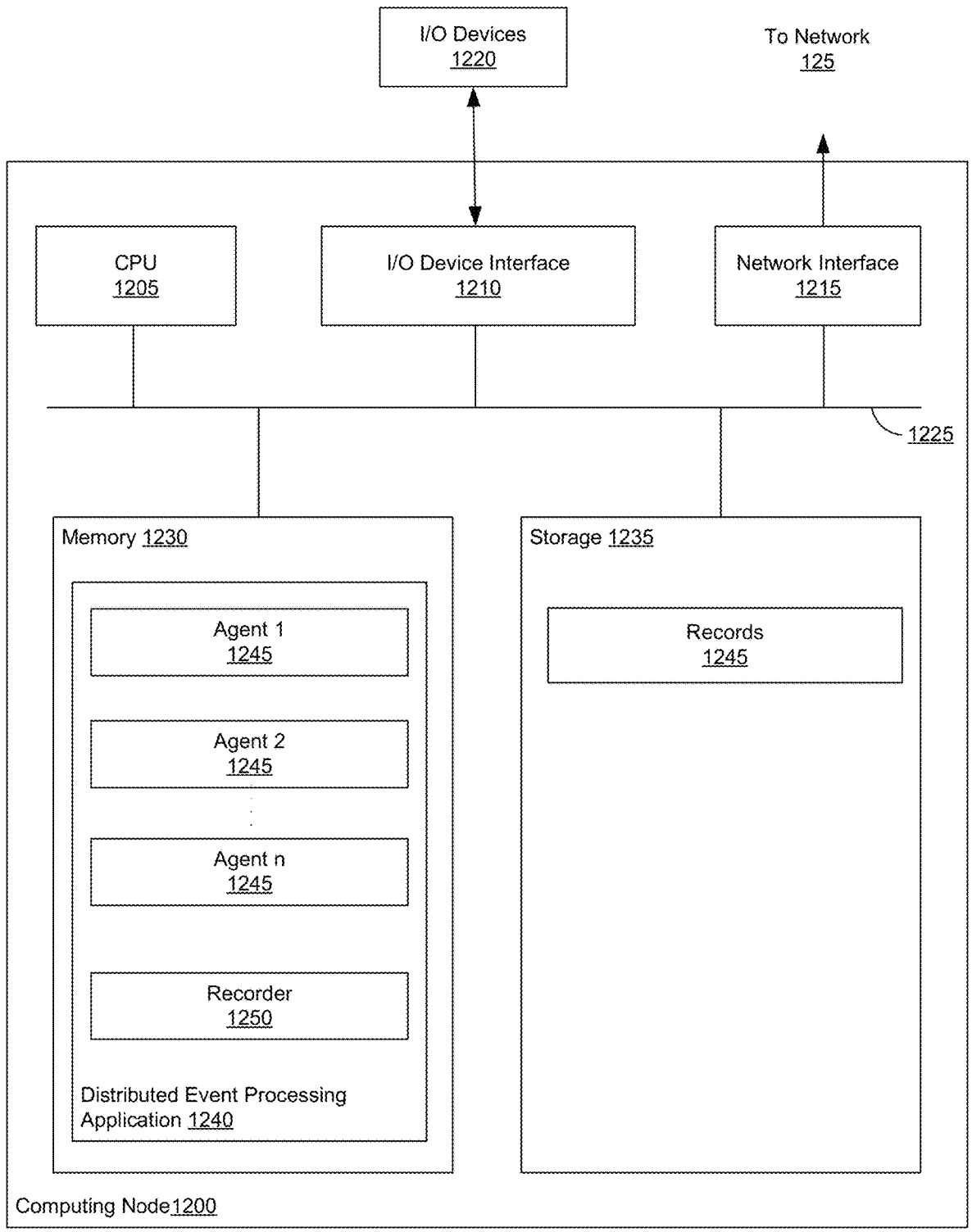
FIG. 12 illustrates the computing node, in accordance with certain aspects of the present disclosure.

FIG. 12 illustrates the computing node 110 of FIG. 1, in accordance with certain aspects of the present disclosure. As shown, the computing node 1200 includes one or more central processing units (CPU) 1205 a network interface 1215, an interconnect 1225, a memory 1230, and storage 1235. The computing node 1200 may also include an I/O devices interface 1210 used to connect I/O devices 1210 (e.g., keyboard, display and mouse devices) to the compute node 1200.

Each CPU 1205 retrieves and executes programming instructions and application stored in the memory 1230. The interconnect 1225 is used to transmit programming instructions and application data between each CPU 1205, I/O devices interface 1210, storage 1235, network interface 1215, and memory 1230. CPU 1205 is included to be representative of a single CPU, multiple CPUs, a single CPU having multiple processing cores, and the like. The memory 1230 is generally included to be representative of a random access memory (e.g., DRAM or Flash). Storage 1235, such as a hard disk drive, solid state device (SSD), or flash memory storage drive, may store non-volatile data as required.

In this example, the memory 1230 includes a distributed event processing application 1240. The distributed event processing application 1240 may contain one or more agents 1245. The agents 1245 receive and evaluation events based on a set of processing rules that may be specified by a developer. The memory 1230 may also contain a recorder 1250. The recorder 1250 may monitor information related to consumed incoming and emitted outgoing events and processing performed by the agents. The recorder 1250 may also communicate with the storage 1235 to store records 1245 containing the monitored information. Additionally, the recorder 1250 may also communicate with the debugger on the management system to coordinate monitoring as well as send the records 1145 to the debugger via the network 125.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., Operational Decision Manager Advanced) or related data available in the cloud. For example, the Operational Decision Manager Advanced could execute on a computing system in the cloud and provide debugging through causality and temporal patterning in an event processing system. In such a case, the Operational Decision Manager Advanced could provide debugging for an event processing system utilizing causality and temporal patterning and store recordings of agents and events at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
    receiving one or more recordings identifying a plurality of events occurring on a first software agent, wherein at least two of the plurality of events occurred effectively simultaneously;
    generating a visualization in a user interface (UI) output on a display showing a timeline for the first software agent, wherein the visualization represents the plurality of events as icons on the timeline based on times associated with the plurality events, and wherein the visualization includes a stacked icon representing the at least two of the plurality of events that occurred effectively simultaneously;
    receiving a request indicating the stacked icon in the visualization;
    updating, in the UI, the stacked icon to present a semi-circle arrangement of icons representing the at least two of the plurality of events that occurred effectively simultaneously;
    determining, by operation of one or more computer processors, a causal chain of events related to a first event corresponding to the stacked icon; and
    updating, in the UI, the visualization based on the causal chain of events to present an ordered sequence of events in the causal chain of events that occurred relative to the first event.

2. The method of claim 1, wherein the visualization further comprises:

representing each event consumed by the first software agent as an icon above the timeline; and representing each event emitted by the first software agent as an icon below the timeline.

3. The method of claim 1, wherein the causal chain of events includes a second event emitted or consumed by a second software agent of a plurality of software agents.

4. The method of claim 3, wherein the second event emitted or consumed by the second software agent was also emitted or consumed by the first software agent.

5. The method of claim 1, wherein the ordered sequence of events is based on events emitted or consumed occurring effectively simultaneously as the first event.

6. The method of claim 1, wherein updating the visualization further comprises highlighting at least one icon in the visualization based on the causal chain of events.

7. The method of claim 1, wherein updating the visualization further comprises fading at least one icon in the visualization that is not associated with the causal chain of events.

8. A system comprising:
one or more computer processors; and
a memory containing a program which when executed by the one or more computer processors performs an operation, the operation comprising:
receiving one or more recordings identifying a plurality of events occurring on a first software agent, wherein at least two of the plurality of events occurred effectively simultaneously;
generating a visualization showing a timeline for the first software agent, wherein the visualization represents the plurality of events as icons on the timeline based on times associated with the plurality events, and wherein the visualization includes a stacked icon representing the at least two of the plurality of events that occurred effectively simultaneously;
receiving a request indicating the stacked icon in the visualization;
updating the stacked icon to present a semi-circle arrangement of icons representing the at least two of the plurality of events that occurred effectively simultaneously;
determining a causal chain of events related to a first event corresponding to the stacked icon; and
updating the visualization based on the causal chain of events to present an ordered sequence of events in the causal chain of events that occurred relative to the first event.

9. The system of claim 8, wherein the visualization further comprises:
representing each event consumed by the first software agent as an icon above the timeline; and
representing each event emitted by the first software agent as an icon below the timeline.

10. The system of claim 8, wherein the causal chain of events includes a second event emitted or consumed by a second software agent of a plurality of software agents.

11. The system of claim 10, wherein the second event emitted or consumed by the second software agent was also emitted or consumed by the first software agent.

12. The system of claim 8, wherein the ordered sequence of events is based on events emitted or consumed occurring effectively simultaneously as the first event.

13. The system of claim 8, wherein updating the visualization further comprises highlighting at least one icon in the visualization based on the causal chain of events.

14. The system of claim 8, wherein updating the visualization further comprises fading at least one icon in the visualization that is not associated with the causal chain of events.

15. A computer program product comprising a computer readable storage medium having computer-readable program code embodied therewith, the computer-readable program code executable to perform an operation comprising:
receiving one or more recordings identifying a plurality of events occurring on a first software agent, wherein at least two of the plurality of events occurred effectively simultaneously;
generating a visualization showing a timeline for the first software agent, wherein the visualization represents the plurality of events as icons on the timeline based on times associated with the plurality events, and wherein the visualization includes a stacked icon representing the at least two of the plurality of events that occurred effectively simultaneously;
receiving a request indicating the stacked icon in the visualization;
updating the stacked icon to present a semi-circle arrangement of icons representing the at least two of the plurality of events that occurred effectively simultaneously;
determining a causal chain of events related to a first event corresponding to the stacked icon; and
updating the visualization based on the causal chain of events to present an ordered sequence of events in the causal chain of events that occurred relative to the first event.

16. The computer program product of claim 15, wherein the visualization further comprises:
representing each event consumed by the first software agent as an icon above the timeline; and
representing each event emitted by the first software agent as an icon below the timeline.

17. The computer program product of claim 15, wherein the causal chain of events includes a second event emitted or consumed by a second software agent of a plurality of software agents.

18. The computer program product of claim 17, wherein the second event emitted or consumed by the second software agent was also emitted or consumed by the first software agent.

19. The computer program product of claim 15, wherein the ordered sequence of events is based on events emitted or consumed occurring effectively simultaneously as the first event.

20. The computer program product of claim 15, wherein updating the visualization further comprises at least one of: (i) highlighting at least one icon in the visualization based on the causal chain of events, or (ii) fading at least one icon in the visualization that is not associated with the causal chain of events.

* * * * *